United States Patent Office 2,850,469
Patented Sept. 2, 1958

2,850,469

SOLUBLE INTERPOLYMERS OF ETHYLENIC MONOMERS AND POLYESTERS OF ALPHA-BETA ETHYLENIC POLYCARBOXYLIC ACIDS

Roger M. Christenson, Whitefish Bay, Wis., assignor to Pittsburgh Plate Glass Company, Allegheny County, Pa., a corporation No Drawing. Application February 3, 1953
Serial No. 334,970

17 Claims. (Cl. 260—22)

This invention relates to the preparation of novel copolymers and interpolymers, and pertains more particularly to soluble, ungelled copolymers of liquid ethylenically unsaturated monomeric compounds with neutral polyesters of (a) a hydroxyl ester of a drying oil acid and a polyhydroxy compound and (b) an unsaturated polycarboxylic acid. These copolymers and interpolymers are extremely useful as vehicles for coating compositions as well as for many other purposes.

It is known that polyesters of the alkyd resin type such as those resulting from the esterification of ethylenically unsaturated polycarboxylic acids, for example, maleic, itaconic or fumaric acid, with polyhydroxy compounds are characterized by their ability to undergo an additional polymerization reaction with liquid ethylenically unsaturated compounds, particularly those monomeric compounds containing the terminal $CH_2=C<$ grouping, preferably joined to a negative radical such as a halogen, acyloxy or aryl radical. The resulting polymers are in a gelled state and exhibit poor solubility in conventional low cost solvents such as xylene, aromatic petroleum naphthas and aliphatic petroleum naphthas.

It has now been discovered that excellent copolymers and interpolymers can be prepared by polymerizing in a solvent therefor a mixture of a liquid ethylenically unsaturated monomeric compound and an essentially neutral polyester of (a) a hydroxyl ester of a drying oil acid and a polyhydroxy compound, and (b) an unsaturated polycarboxylic acid. By carrying out the polymerization in the presence of a solvent for the component of the polymerization mixture the resulting copolymers and interpolymers are clear, ungelled products which are readily soluble in conventional solvents and which can be utilized to prepare coatings having unusually good hardness, flexibility, chemical resistance and drying speed. It has been found that the interpolymerization process does not necessarily reduce the oil unsaturation but instead can take place through the introduced reactive double bond. In this respect, the products of the present invention are greatly superior to copolymers of the conventional alkyd type resins with ethylenically unsaturated monomers, since in the latter copolymers the polymerization process tends to reduce the oil unsaturation to a point where the resultant copolymer resembles an internally plasticized lacquer-type polymer and is deficient in further cross-linking and curing properties. In the polymers of the present invention, however, a large proportion of the residual unsaturation remains and is available for drying and cross-linking the resultant films.

The process of this invention consists of three essential steps. In the first step an ester of a drying oil acid suitable for subsequent esterification with an ethylenically unsaturated polycarboxylic acid is prepared. The first step ester may be prepared by any of the well-known techniques of esterification. For example, the free drying oil acid such as may be obtained by hydrolysis of drying oils or oils containing drying oil acids may be reacted with a polyhydroxy compound such as a glycol, glycerol or other polyhydroxy compound containing two or more hydroxyl grups, preferably, but not necessarily, in such proportion as to provide one free hydroxyl group in each molecule of the resultant polyhydric alcohol ester.

A more common procedure in preparing esters of drying or semi-drying oils is partially to alcoholize a drying oil such as linseed oil or soya oil with an alcohol such as glycerol or the like, which alcohol contains a plurality of hydroxyl groups in the molecule. In the event that glycerol is employed as the polyhydric alcohol for alcoholysis of the drying oil, diglycerides are formed in substantial quantities. Of course, where conventional oils are employed in the alcoholysis reaction, there will be considerable variation in the structure of the products. In most instances, however, many of the acid groups will include a plurality of double bonds. It may also be that some monoglycerides are formed and there will ordinarily be some unchanged polyhydric alcohol and unchanged glycerides remaining in the mixture. However, it appears that a large proportion, probably a majority, of the ester molecules are monohydric. It is improbable that more than 50 molar percent of glyceride molecules are dihydric and it is more likely that the ratio of dihydric glycerides of fatty acids to monohydric glycerides is 1 to 2 or less and in some instances it probably approaches 0.

Any polyhydric alcohol may be employed in preparing the esters of fatty acids or drying oil acids in the first step of the present process. Preferably, the polyhydric compound contains from about 2 to 6 hydroxyl groups per molecule. Examples of polyhydric compounds which may be utilized include ethylene glycol, diethylene glycol, propylene glycol, glycerol, pentaerythritol, polyethylene glycol, sorbitol, tetramethylol cyclohexanol, alpha methyl glucoside, erythritol, dipentaerythritol, polypentaerythritol, polyallyl alcohol, and the like, as well as mixtures of any two or more of the above polyhydric compounds.

The drying oil acids utilized in preparing the first step esters in accordance with the present invention include the acids of substantially any of the glyceride oils recognized as having drying properties. The so-called semi-drying oils are also included in conventional stocks of free fatty acids and in the conventional glyceride oils of such acids a plurality of acids will occur as a mixture either in free or in the combined state. In most instances, some saturated acid such as stearic acid or palmitic acid, as well as semi-saturated acids such as oleic acid will be present in admixture with the more highly unsaturated acids such as linoleic acid or linolenic acid. The mixed acids may be employed, as may the relatively pure acids such as are obtained by distillation of the acid mixture under vacuum. Oils consisting essentially of non-drying constituents, for example, coconut oil and palm kernel oil, may also be utilized with good results.

Convenient sources of these acids are the drying and semi-drying oils such as linseed oil, cottonseed oil, safflower oil, soybean oil, tung oil, oiticia oil, menhaden oil, sardine oil and the like. Soap stocks from the refining of these oils are also sources of acids which may be utilized in the process of this invention. Other acids which may be used include those containing a plurality of non-conjugate double bonds, for example, linoleic acid, linolenic acid, clupandonic acid and the like. Additionally, the esterification may be carried out utilizing a mixture of one of the drying oil acids set forth hereinabove together with a saturated polycarboxylic acid such as malonic acid, succinic acid, glutaric acid, adipic acid, pimelic acid, suberic acid, azelaic acid, phthalic acid and the like.

Where the hydroxy esters of drying oil acids with a polyhydric alcohol are prepared by alcoholysis of the glyceride oil with a polyhydric compound, the techniques commonly employed in the preparation of esters for the modification of alkyd resins may be utilized. Such alcoholysis is a well-known procedure and involves the heating of about 2 moles of the oil with the desired proportion of the polyhydric compounds, preferably in the presence of an alcoholysis catalyst such as litharge, and also in the presence of an inert gas designed to prevent oxidation of the double bonds of the hydrocarbon groups in the fatty acids. Temperatures in the range of about 150 degrees C. to 300 degrees C. or higher are ordinarily utilized in preparing the drying oil esters.

Any ethylenically unsaturated polycarboxylic acid may be reacted with the first step ester to form essentially neutral esters in accordance with the second step process. Included within this class of compounds are maleic acid, fumaric acid and the like. Preferably, the acid contains at least one carboxyl group in alpha relationship to the ethylenic group to provide a group of the structure C=C—C=O. Unsaturated polycarboxylic acids containing halogen or other substituent groups may also be utilized, as may the anhydrides of the unsaturated polycarboxylic acids; in fact, the anhydrides are preferably utilized in the esterification reaction and it is intended that the term "acid" include the corresponding anhydride.

The esterification reaction between the ethylenically unsaturated polycarboxylic acids selected from the group disclosed and the ester of the drying oil acid and polyhydric compound to form essentially neutral esters is preferably carried out in an inert diluent which is heated to reflux. The diluent may be a material such as xylene, toluene, solvent, naphtha or any other suitable liquid solvent which is non-reactive with the ethylenically unsaturated polycarboxylic acid and the ester of the drying oil acid with the polyhydric compound and which is of reasonably high boiling point. Normally, this esterification reaction is conducted under an azeotropic separator designed to pass the evolved water from the system while returning the solvent for further cycling in the reaction. Since the solvent is thus recycled or refluxed, the reaction may be conducted with relatively small amounts thereof, for example, from about 10 to 20 percent based on the total weight of the reactants, although even smaller or larger amounts may be utilized if desired.

The reaction may be carried out in any convenient apparatus. For example, on a laboratory scale the reaction may be carried out in a conventional glass flask provided with temperature measuring means, a reflux condenser and like conventional devices. When the reaction is carried out on a larger scale, for example such as may be employed in a factory, a conventional kettle such as a stainless steel kettle commonly used in the paint and varnish industry, is satisfactory. This may be provided with temperature measuring means, agitators, condensers, sources of inert gas and the like. The apparatus should also be provided with suitable means for obtaining desired reaction temperatures. Suitable heating devices include steam or electrical coils or gas burners and the like. Means should also be available for taking small samples from the reaction mixture in order to test periodically the viscosity, acid number and like criteria of esterification reactions.

The esterification reaction is customarily carried out at the boiling temperature of the mixture of reactants and solvent, if any, until water ceases to evolve, or until the reaction temperature reaches a predetermined value, or until the polyester reaches a predetermined viscosity value as determined by standard viscosity tests. In any event, the reaction is stopped before the product becomes infusible and insoluble in petroleum naphtha. Normally such value will be obtained when the reaction mixture reaches a temperature within the range of 150 degrees C. to 250 degrees C. In order that the functionality of the unsaturated acid double bond will not be substantially reduced, the temperature should be maintained at a level below that at which the acid will add to the oil. In most cases the reaction is sufficiently complete in a period of about 2 to 20 hours.

The proportions of the ethylenically unsaturated polycarboxylic acid and the ester of the drying oil acid with the polyhydric compound which are utilized in preparing the second step product are important in obtaining a product which may in turn be polymerized with a compound containing a terminal $CH_2=C<$ grouping to form a soluble, ungelled interpolymer. Generally, the reactants will be so proportioned that the esters formed will have a fatty acid content which, if calculated as equivalent glyceride oil, would constitute about 75 percent to 90 percent by weight of the total mixture of reactive components of the ester system. The ethylenically unsaturated polycarboxylic acid ester groups in the molecules of the resulting ester of the unsaturated acid and the fatty acid will constitute about 10 percent to 25 percent by weight of the total ester product. Free polyhydroxy compound may also be present in the esters of the unsaturated acid in small quantities. Stated in still another way, the ethylenically unsaturated polycarboxylic acid or its anhydride may be employed in such an amount that from 25 to about 50 molar percent of the hydroxyl groups of the polyhydric compound are esterified by the ethylenically unsaturated polycarboxylic acid. The preferred range is about 33 to about 45 molar percent. If the foregoing proportions are substantially departed from, unfavorable results are likely to be obtained. For example, if too large a proportion of fatty acid is present, the compound containing a terminal $CH_2=C<$ group will tend to be incompatible with the neutral ester. If too small a proportion of fatty acid is present, the mixture may tend to gel when the ethylenic compound is added thereto.

It is to be understood that permissible proportions of the constitutents of the ethylenically unsaturated polycarboxylic acid ester will vary for different oils and acids. Also, the polyhydric compound influences the permissible proportions, as do the excesses of the polyhydric compound, the solvent employed, the reaction catalyst if any, the amount of catalyst and the method of adding the catalyst. The composition of the polyester mixture may also be influenced by the ethylenic compound which is subsequently employed in the copolymerization. However, satisfactory proportions will, in general, be found in the above indicated ranges.

The esters of the ethylenically unsaturated polycarboxylic acid and the drying oil acid-polyhydric compound esters obtained in the second step process are of low acid number, for example 15 or lower, so that it is apparent that very few available carboxyls are present in the resultant ester. The ester is, therefore, not a partial or a half ester, but rather is an essentially neutral ester. The preparation of such an essentially neutral ester and its subsequent polymerization with a compound containing a terminal $H_2C=C<$ group constitutes a most unusual feature of the present invention since it has heretofore been believed impossible to polymerize a substantially neutral ester of an ethylenically unsaturated polycarboxylic acid with a drying oil-polyhydric compound ester and a compound containing a terminal $CH_2=C<$ group to obtain a soluble, ungelled copolymer. In fact, it has been believed heretofore that a half ester must be polymerized with an ethylenic monomer and the polymer subsequently esterified in order to obtain a resultant copolymer which would be ungelled and readily soluble in conventional solvents.

The third and final step of the process of the present invention, and the step whereby soluble, ungelled interpolymers are obtained involves the polymerization of the ester obtained in the second step, that is, the ester prepared by esterification of an ethylenically unsaturated polycarboxylic acid with an ester of a drying oil acid and a polyhydric compound, and a monomeric material containing the terminal $CH_2=C<$ grouping. Included among the compounds possessing the $CH_2=C<$ grouping and which may be polymerized with the second step ester in accordance with this process are:

(1) Monoolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-propene-1, 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2,4,4-trimethyl-pentene-1, 2-methyl-octene-1, 2,6-dimethyl-heptene-1, 2,6-dimethyl-octene-1, 2,3-dimethyl-decene-1, 2-methylnonadecene-1, ethylene, propylene, butylene, amylene, hexylene and the like;

(2) Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrene, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromo-butene, 2-bromoheptene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2,2-tetrafluoroethylene, 1,1,2,2-tetrachloroethylene, 1-chloro-2,2,2-trifluoroethylene and the like;

(3) Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl c-bromobenzoate, isopropenyl m-chlorobenzoate, isopropenyl toluate, isopropenyl alpha-chloroacetate and isopropenyl alpha bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters as well as esters from such alkenyl alcohols as beta-ethyl allyl alcohol, beta-propyl allyl alcohol, 1-buten-4-ol, 2-methyl-buten-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate and diethyl glutaconate;

(4) Organic nitriles such as acrylonitrile methacrylonitrile, ethacrylonitrile, 3-octenenitrile, crotonitrile, oleonitrile, and the like;

(5) Acid monomers such as acrylic acid, methacrylic acid, crotonic acid, 3-butenoic acid, angelic acid, tiglic acid and the like.

It is to be understood that the above polymerizable monoolefinic monomers represent but a relatively small percentage of the monomers which may be polymerized with the second step product to form the copolymers and interpolymers of the present invention.

The polymerization of the second step ester with one or more of the compounds selected from the group disclosed hereinabove must be carried out in an inert, nonreactive solvent or diluent in order that soluble, ungelled copolymers and interpolymers will be obtained. Suitable diluents or solvents include xylene, toluene, carbon tetrachloride, ethylene dichloride or other non-reactive material; that is, one that does not react with either reactant to an appreciable extent, and which is a solvent or diluent for both the second step ester and the ethylenic monomer.

The quantity of solvent or diluent utilized is not critical and may be varied widely. For example, a solvent or diluent may be employed in a proportion of 0.10 to 10 or more parts by weight based on the total weight of the copolymerizable components of the polymerization mixture.

The quantity of the ethylenic monomer which is included in the polymerization mixture is also subject to wide variation. For example, the copolymers and interpolymers of the present invention can be prepared utilizing in the polymerization mixture proportions as low as five or ten percent by weight, or lower, of the ethylenically unsaturated compound based upon the weight of the second step ester which is utilized. On the other hand, the ethylenic monomer which may be employed in an amount as high as 75 or 80 percent or even higher by weight, also based upon the weight of the second step ester in the polymerization mixture. The fact that the ethylenic monomer can be utilized in such widely varying proportions in order to obtain soluble, ungelled copolymers and interpolymers constitutes an important advantage of the present invention. Heretofore, it has been believed that the use of more than about 15 percent by weight of the ethylenic monomer would result in the production of a copolymer or interpolymer having a gelled composition and being insoluble in conventional solvents.

A polymerization catalyst is preferably included in the polymerization mixture. Typical catalysts which may be utilized include the peroxygen compounds such as silver peroxide, the perborates, the percarbonates, benzoyl peroxide, o,o'-dichlorobenzoyl peroxide, o,o'-dibromobenzoyl peroxide, tertiary butyl hydroperoxide, cumene hydroperoxide, lauroyl peroxide, caproyl peroxide, acetone peroxide, pelargonyl peroxide, tetralin peroxide, paramenthane hydroperoxide, diisopropylbenzene hydroperoxide, as well as other polymerization catalysts including the diazo compounds and the like. The quantity of catalyst utilized may be varied widely. In general, however, it may be stated that the polymerization is preferably carried out in the presence of about 0.1 to about 5 percent by weight based upon the weight of the copolymerizable materials in the polymerization mixture.

The polymerization mixture, including the catalysts, is then preferably heated to a temperature of about 75 degrees to 150 degrees C. or even higher. A very satisfactory temperature is obtained upon a steam bath, which is, of course, at a temperature of about 100 degrees C. The time required for the polymerization to take place varies ordinarily from about 2 to 16 hours depending upon the polymerization conditions and the particular ethylenic monomer which is utilized. Preferably, the reaction is carried out under an inert gas such as carbon dioxide, nitrogen or the combustion products resulting from the burning of butane in an atmosphere of air. The polymerization may also be achieved by irradiation of the mixture with actinic light, in the presence or absence of catalysts and at room temperature or at greatly elevated temperatures.

The resulting copolymer is generally a heavy, resinous mass which is too viscous to pour at room temperature but which still retains flow properties under such conditions. The composition is homogeneous and, as will be demonstrated hereinafter, deposits homogeneous films; however, it is to be understood that the compositions may contain small quantities of other copolymers and also small quantities of homopolymers.

The homogeneous composition which is obtained in the polymerization reaction can be diluted with non-reactive diluents or solvents selected from those disclosed hereinabove, or their equivalent, to substantially any degree to obtain a desired viscosity and concentration of solids in the solutions. The solutions can be applied by the conventional methods of coating such as spraying, brushing or roller coating. The solutions may also be catalyzed to promote drying with conventional siccatives from the paint and varnish arts including oleates, linoleates, naphthenates and the like of cobalt, nickel, manganese, lead and other similar heavy metals, the siccatives being designed to effect cross-linking of the ester molecules at points of unsaturation in the fatty acid molecules. Preferably the siccative compound is employed in an amount of about 0.01 to 1 or 2 percent by weight based upon the solids content (percentages are calculated on the basis of the active metal).

Films of the foregoing solutions may be applied to wood, metal, concrete, brick or similar surfaces. The solvent utilized in preparing the compositions may be evaporated and the resin content may be subjected to baking at a temperature of about 100 degrees C. to 300 degrees C. or any other temperature which will effect hardening of the plastic material without charring or discoloration. Pigments, extenders and the like may also be added to the compositions to give useful results.

In the above description, special emphasis has been placed upon products which are copolymers or interpolymers of ethylenically unsaturated compounds and essentially neutral esters of alpha-beta unsaturated polycarboxylic acids with hydroxy esters of drying oil acids. However, it is also possible to further modify such copolymers or interpolymers. For example, the copolymers and interpolymers can be admixed with cyclopentadiene or dicyclopentadiene, or other cyclopentadiene homopolymers, in an autoclave and subjected to a temperature of about 250 degrees to 350 degrees C. The pressure utilized may be those autogeneously generated or even higher. The resulting products are useful copolymers and interpolymers modified with cyclopentadiene. Other modifying materials may also be employed. Such other modifiers include polyesters of glycols and unsaturated polycarboxylic acids or with modifications thereof consisting of mixed polyesters of glycols, the alpha-beta unsaturated polycarboxylic acid and saturated polycarboxylic acids such as succinic acid or phthalic acid.

The following examples are intended to illustrate more fully the preparation of copolymers and interpolymers in accordance with the practice of this invention. The examples are now, however, intended to limit the scope of the invention for there are, of course, numerous possible variations and modifications.

EXAMPLE I

This example illustrates the preliminary alcoholysis of glyceride oil and the subsequent esterification thereof with a dibasic acid containing an ethyleneic group to provide an ester which is essentially neutral.

The alcoholysis of glyceride oils is conventional in the alkyd resin art. The techniques employed are also applicable to the preparation of partial glycerides that can be esterified with dicarboxylic acids containing an alpha-beta ethylenic group in accordance with this invention. The method is illustrated by the alcoholysis of linseed oil with glycerine, which was conducted as follows:

In the reaction, a 5 liter, 3 necked glass flask equipped with a reflux condenser, an agitator and a thermometer was employed as a reaction vessel. The oil in an amount of 2,212.5 grams (2.5 moles) was introduced into the flask along with 169.3 grams (1.67 moles plus a 10 percent excess) of glycerol. The mixture was blanketed with an inert gas (from combustion of butane) and was then heated with agitation to 190 degrees C. At this temperature, 1.25 grams of litharge was added as an alcoholysis catalyst. The mixture was maintained at 190 degrees C. until alcoholysis was complete. The product was suitable for esterification with any of the dibasic acids herein disclosed. Similar methods are applicable to the alcoholysis of other oils such as soya oil, safflower oil, cottonseed oil and the like.

The esterification of the preceding product of the alcoholysis of linseed oil and glycerol is typical and was conducted as follows:

A 32.5 gram quantity (2.5 moles) of itaconic acid was introduced into the alcoholysis product of the linseed oil and a reflux condenser and an azeotropic separator were applied to the reaction flask described hereinabove and esterification was carried to completion at 210 degrees C., using xylene as the solvent. The reaction was continued for 7 hours, at which time it was stopped and the product was filtered. The product was a polyester which had an acid value of 9.5, a hydroxyl value of 29.3 and a solids content of 93.8 percent by weight. The Gardner color was 10 and the Gardner viscosity was G. In the final ester product 60 molar percent of the combined hydroxyl groups were of fatty acids and 40 molar percent were of itaconic acid. The product was an essentially neutral ester of itaconic acid and the diglycerides of linseed oil acids.

This procedure is typical and may be employed to prepare various neutral esters of itaconic acid and monohydric esters of drying oil acids.

The apparatus above described and the method employed in connection therewith was employed to prepare a series of polyesters of polyols and mixtures of itaconic acid and drying oil acids or partial esters of drying oil acids. The composition and certain of the properties of the polyesters are presented in Table A below:

Table A

| No. | Oil | Percent oil | Percent polyol dibasic ester | Percent free polyol | Polyol | Molar percent hydroxyl as itaconate | Gardner viscosity | Acid value avg. |
|---|---|---|---|---|---|---|---|---|
| 1 | Soy | 87.8 | 11.7 | 0.5 | Ethylene glycol | 33 | A | 10.2 |
| 2 | Soy | 86.2 | 13.3 | 0.5 | do | 36.5 | A | 10.9 |
| 3 | Soy | 84.5 | 14.9 | 0.6 | do | 40 | | 14.6 |
| 4 | Soy | | | | do | 45 | A | 10.3 |
| 5 | Soy | 78.5 | 20.7 | 0.9 | do | 50 | | 12.8 |
| 6 | Soy | 78.5 | 20.7 | 0.9 | Glycerol glycol | 50 | | 10.11 |
| 7 | Soy | 87.8 | 11.7 | 0.5 | do | 33 | A | 9.5 |
| 8 | Soy | 84.5 | 14.9 | 0.6 | do | 40 | | 8.4 |
| 9 | Soy | 87.4 | 12.1 | 0.5 | Pentaerythritol | 33 | A | 11.6 |
| 10 | Soy | 85.7 | 13.7 | 0.6 | do | 36.5 | G | 12.0 |
| 11 | Soy | 84.5 | 14.9 | 0.6 | do | 40 | | 8.8 |
| 12 | Lin | 87.8 | 11.7 | 0.5 | Ethylene glycol | 33 | A | 10.2 |
| 13 | Lin | 84.5 | 14.9 | 0.6 | do | 40 | | 10.6 |
| 14 | Lin | 87.9 | 11.6 | 0.5 | Glycerol | 33 | A | 10.6 |
| 15 | Lin | 86.2 | 13.3 | 0.5 | do | 36.5 | E | 9.6 |
| 16 | Lin | 84.5 | 14.9 | 0.6 | do | 40 | A | 14.0 |
| 17 | Lin | 87.4 | 12.1 | 0.5 | Pentaerythritol | 33 | A | 8.4 |
| 18 | Lin | 85.7 | 13.7 | 0.6 | do | 36.5 | H | 10.00 |
| 19 | Lin | 83.9 | 15.4 | 0.7 | do | 40 | A | 10.1 |
| 20 | Saff | 87.8 | 11.7 | 0.5 | Glycerol | 33 | A | 8.0 |
| 21 | Saff | 84.5 | 14.9 | 0.6 | do | 40 | A | 10.8 |
| 22 | Dh. C | 87.8 | 11.7 | 0.5 | Ethylene glycol | 33 | | 4 |
| 23 | Dh. C | 84.5 | 14.9 | 0.6 | do | 40 | | 7.4 |

NOTE.—The abbreviations lins.=linseed; soy=soybean; Saff.=Safflower; Dh. C.—dehydrated castor.

These esters can be interpolymerized with liquid, compatible compounds containing the $>C=CH_2$ group to produce valuable coating compositions.

In the preceding table (A) itaconic acid was employed as the ethylenically unsaturated dicarboxylic acid. However, neutral or essentially neutral mixed esters of polyols, fatty acids, and other polycarboxylic acids containing an alpha-beta ethylenic group may be employed in the preparation of valuable interpolymers. For example, itaconic acid may be replaced by fumaric acid. A very valuable series of esters may also be prepared by the use of maleic acid (or its anhydride). These constitute the most valuable acids from a commercial viewpoint, but other dicarboxylic acids containing an alpha-beta ethylenic group are also operative. Since commercial considerations are often subject to change, it is intended to include such other acids within the scope of the invention. Likewise, the several dicarboxylic acids may contain substituents such as one or more chlorine atoms, alkyl groups and other groups. These will often affect the solubility characteristics of the ester products and the polymers derived therefrom by interpolymerization reactions, but the resulting products are nevertheless useful for many purposes.

Esters of maleic acid and fumaric acid prepared by the techniques described for the preparation of esters of itaconic acid are presented in Table B. In the latter, the numerals in the column headed Hydroxyl designate percent hydroxyls which are esterified by the unsaturated dicarboxylic acids.

Table B

| No. | Oil | Polyol | Dibasic acid | Hydroxyl |
|---|---|---|---|---|
| 1 | Linseed | Pentaerythritol | Maleic | 25 |
| 2 | do | do | do | 29 |
| 3 | do | do | do | 33 |
| 4 | do | do | do | 40 |
| 5 | do | do | do | 50 |
| 6 | Soya | do | do | 33 |
| 7 | do | Ethylene glycol | do | 33 |
| 8 | Linseed | Pentaerythritol | Fumaric | 33 |
| 9 | do | Glycerine | do | 33 |

A part of the ethylenically unsaturated dicarboxylic acids disclosed in Table B can be replaced by a corresponding amount of a dibasic acid free of ethylenic groups and being represented by phthalic acid, sebacic acid, adipic acid, azelaic acid and others. A portion of the oil utilized can also be replaced by such an acid if desired. Naturally such substitution tends to reduce the ethylenic functionality of the esters and to modify the properties of the ultimate interpolymers, which is often desirable. If a non-ethylenic acid is employed, the amount thereof may be in a range of 1 to 20 percent. If the non-ethylenic acid is omitted, the reaction mixture is fully operative, as is evident from the above table. Stated conversely, the dibasic acid component must be at least 80 percent by weight of the alpha-beta ethylenic type.

The neutral esters described hereinabove can be copolymerized with a wide variety of liquid, soluble ethylenic compounds (such as have been mentioned), which may be employed in a wide range of proportions. For example, the copolymerizable mixtures may contain only small amounts of the ethylenic compound, e.. g. 5 or 10 percent by weight based upon the weight of the total mixture. On the other hand, the mixtures may contain much larger amounts of the ethylenic compound, e. g. up to 75 or 80 percent or more by weight based upon the weight of the total mixture.

Various of the polyesters from the foregoing tables A and B were admixed with soluble, liquid ethylenic compounds containing the $>C=CH_2$ group, preferably attached to a negative group to provide copolymerizable mixtures which could be sheeted out or spread as films upon various surfaces and dried or cured. Some of these are illustrated by the appended examples.

EXAMPLE II

In this example, samples of the alkyd resin or polyester described as Number 3 in the Table A were copolymerized with styrene in varying amounts. The reactants, namely the polyester and the styrene, were introduced in weighed amounts into test tubes and a benzoyl peroxide catalyst was added to each test tube in an amount of 0.1 gram. Inert diluent or solvent was also present in an amount of 10 grams for each sample. The test tubes were then introduced into a steam bath and held for 2 hours at steam bath temperatures. The resultant solutions were then cast as films and were dried at 250° F. for one hour. The resultant films were clear and homogeneous. The compositions of the several solutions in terms of polyester, styrene and xylene (solvent) along with the so-called Sward hardness of the baked films obtained, are tabulated as follows:

| Gms. alkyd | Gms. styrene | Gms. xylene | Percent combined styrene | Sward hardness of baked film |
|---|---|---|---|---|
| 7 | 3 | 10 | 19.6 | 4 |
| 6 | 4 | 10 | 29.9 | 10 |
| 5 | 5 | 10 | 41.4 | 18 |
| 4 | 6 | 10 | 48.3 | 21 |
| 3 | 7 | 10 | 61.5 | 34 |

EXAMPLE III

In this example, methyl methacrylate was employed as an ethylenic compound in place of the styrene utilized in Example II. A series of the mixtures of polyester and methyl methacrylate were made up in test tubes, catalyzed, heated, sheeted out and baked as in Example II. The compositions of the several samples and the Sward hardness of the baked films obtained therefrom are presented in the following table:

| Gms. alkyd | Gms. methyl methacrylate | Gms. xylene | Gms. methyl methacrylate | Sward hardness of baked film |
|---|---|---|---|---|
| 3 | 7 | 10 | 68.2 | 27 |
| 4 | 6 | 10 | 57.2 | 20 |
| 5 | 5 | 10 | 45.2 | 12 |
| 6 | 4 | 10 | 32.8 | 6 |
| 7 | 3 | 10 | 22.0 | 4 |

EXAMPLE IV

In this example, the styrene of Example II was replaced by acrylonitrile in a series of samples corresponding in proportions to those given in Example II. The several samples in test tubes and appropriately catalyzed were first heated on a steam bath in the manner described in Example II and subsequently the solutions were sheeted out and cured. The Sward hardness of the resultant films and the several compositions from which they were derived are tabulated below:

| Gms. alkyd | Gms. acrylonitrile | Gms. xylene | Percent combined monomer | Sward hardness of baked film |
|---|---|---|---|---|
| 7 | 3 | 10 | 10.6 | 4 |
| 6 | 4 | 10 | 19.8 | 6 |
| 5 | 5 | 10 | 28.5 | 6 |
| 4 | 6 | 10 | 41.7 | |
| 3 | 7 | 10 | 50.5 | 8 |

EXAMPLE V

In this example, 3 gram quantities of a polyester, namely the one bearing the Number 4 in Table A, were placed in test tubes along with .05 gram quantities of benzoyl peroxide and 10 grams of xylene. An ethylenic compound or a mixture of such compounds was added to the test tubes and the test tubes containing the mixtures were heated on a steam bath for 3 hours. Subsequently, the mixtures were cast as films upon panels and were baked at 250 degrees C. for a period of 1 hour. The ethylenic compounds and the proportions thereof in grams in the several samples, along with the percentages of solids in the product; percentages of combined monomer in the product, appearance of the film and hardness are tabulated as follows:

| Monomer or mixture of monomers | Grams monomer | Percent solids in product | Percent combined monomer in product | Appearance of film baked at 250° C. | Sward hardness of baked film |
|---|---|---|---|---|---|
| Ethyl methacrylate | 7 | 38.9 | 65.5 | Clear and hard | 10 |
| Butyl methacrylate | 7 | 39.3 | 66.0 | Clear—sl. tack | |
| Methyl methacrylate | 7 | 38.7 | 65.4 | Clear—hard | 21 |
| Do | 2 | 38.2 | 64.9 | Clear—soft | 4 |
| Butyl methacrylate | 5 | | | | |
| Methyl methacrylate | 3.5 | 39.4 | 66.1 | Clear—hard | 12 |
| Do | 5 | 38.3 | 65.0 | do | 18 |
| Butyl methacrylate | | | | | |
| Methyl methacrylate | 3.5 | 40.2 | 66.6 | do | 21 |
| Do | 3.5 | 33.8 | 60.4 | Clear—soft | 4 |
| Ethyl acrylate | 3.5 | | | | |

EXAMPLE VI

In this example, 400 grams of a polyester, corresponding to Number 17 as given in Table A, was admixed with 600 grams of styrene and 900 grams of xylene. The mixture was heated to refluxing temperature, at which point 20 milliliters of xylene solution containing one gram of cumene hydroperoxide were added and the mixture was refluxed in a flask under a reflux condenser. Four additional quantities of cumene hydroperoxide comprising one gram of the cumene hydroperoxide in 20 milliliters of xylene, were added at one hour intervals. At the end of 5 hours, the reaction mixture was cooled. A bright, clear solution resulted, from which clear films could be cast. Some solvent and styrene were distilled from the mixture to give a final solution containing 50.1 percent by weight of solids. The solution had a viscosity of R on the Gardner scale and a Gardner color of 5. Films cast from the material were hard and clear. The combined styrene content of the final resin solids was 52.3%. The material was formulated into enamel-like finishes.

EXAMPLE VII

In this example, 500 grams of methyl methacrylate and 500 grams of the polyester of Example III in Table A dissolved in 1000 grams of xylene were made up and 6.5 grams of benzoyl peroxide were added. The mixture was held at 100° C. for 16 hours. At the conclusion of this time, the excess of methyl methacrylate and some of the solvent were distilled from the reaction mixture to provide a final solution containing 51.6% by weight of solids and having a Gardner viscosity of from L to M and a Gardner color of 6 to 7. The solvent-free resin contained 38.5% by weight of methyl methacrylate.

EXAMPLE VIII

In this example, 7 grams of a polyester corresponding to Number I as given in Table A was admixed with 11 grams of styrene and 7 grams of butadiene together with 0.25 gram of benzoyl peroxide. The mixture was heated at 150° C. for 16 hours in a rocker-type autoclave. The final product contained 54.3% of combined monomer. Clear, flexible and reasonably hard films were deposited from the solution when the latter was spread out as a film. The butadiene serves to increase the flexibility of the product without impairing chemical resistance.

EXAMPLE IX

In this example, a mixture comprising 25 grams of the polyester No. 2 in Table A, 75 grams of vinyl acetate and 1.5 grams of benzoyl peroxide was made up and refluxed for 6 hours. The product was then subjected to distillation to remove the excess monomer and thus to provide a viscous resinous mass containing 48.7% of combined vinyl acetate. A solution of the resin in xylene when spread as a film on glass, deposited a clear, flexible film.

EXAMPLE X

In this example, soya oil was alcoholized with pentaerythritol to provide a partial ester of said oil in which about one hydroxyl in three was available. This material was then esterified with maleic anhydride in an amount to provide a mixed ester which was essentially neutral and in which about 33% of the hydroxyls were esterified with a carboxyl of maleic acid. Esterification was continued until a viscosity of R and a solids content of 93.6 percent was attained. A 22.5 gram sample of this ester was mixed with 27.5 grams of styrene, 0.25 gram of cumene hydroperoxide and 50 grams of an aromatic naphtha of a K. B. value of 75 and boiling in a range of 135–185° C. The mixture was refluxed for 5 hours, or until a viscosity of Y was attained at a solids content of 68.2. Excess monomer and some solvent were distilled. The resin was clear and solutions thereof could be spread to provide coating films.

EXAMPLE XI

In this example, linseed oil was alcoholized with pentaerythritol to provide a product in which about 33% of the hydroxyls were free. This product was esterified with maleic anhydride to form an ester of a viscosity of V and a solids content of 90.0 percent. A mixture was prepared comprising 135 grams of ester, 165 grams of styrene, 400 grams of aromatic naphtha (same as employed in Example X) and 1.25 grams of cumene hydroperoxide were added in increments. The mixture was refluxed 5 hours and some styrene and some monomer were distilled to form a clear, liquid, xylene-soluble product. The product would form clear films of hardness of 13. The product had a viscosity of R.

In Examples X and XI styrene was employed as monomer compound containing a >C=CH$_2$ group. It will be appreciated that styrene in these and other examples may be replaced in full, or in part, by many other monomers to provide useful products. Thus styrene may be, at least in part, replaced by alpha methyl styrene or vinyl toluene. It may also be replaced in full or in part by vinyl ethers, vinyl acetate, ethyl methacrylate, methyl methacrylate, octyl methacrylate, acrylonitrile, vinyl cyclohexene, and vinyltriethoxysilane. A part of the styrene may be replaced by diolefin hydrocarbons including butadiene, isoprene, dicyclopentadiene, alpha pinene and others.

EXAMPLE XII

A monobasic acid containing an ethylenically unsaturated group may be employed as a modifier in the copolymerizable mixture. For example, there was provided a base resin which was comprised of soya oil, linseed oil, pentaerythritol and maleic anhydride. In the ester, approximately 33 molar percent of the hydroxyls were reacted with the maleic component and the ester was 90.7 solids and had a viscosity of R plus.

The ester was mixed in a proportion of 135 grams with 165 grams of styrene and 3 grams of acrylic acid and 400 grams of an aromatic naphtha of a K. B. value of 75, and boiling in a range of 135–185° C. was employed as a solvent. The mixture was refluxed for 5 hours and during this time the catalyst (1.25 grams of cumene hydroperoxide) was incorporated in increments. At the conclusion of the reaction, some solvent and styrene were distilled. The product was spread as a film upon a surface and dried. The dried films were clear, flexible and possessed good adhesion to metals.

EXAMPLE XIII

A mixture of vinyl acetate and vinyl chloride, as the monomer component of the interpolymers, provides products of good hardness, flexibility and chemical resistance. In an example, a substantially neutral ester of soya oil, pentaerythritol and maleic acid in which 33 molar percent of the hydroxyls were esterified with maleic acid was employed as a base resin. The ester was of a solids content of 92.7 percent and had a viscosity of N. In preparing the interpolymer, 7 grams of this ester were mixed with 14 grams of vinyl acetate, 14 grams of vinyl chloride, 12.8 grams of xylene (solvent), and 0.7 gram of benzoyl peroxide was added as a catalyst of copolymerization. The mixture was heated at a temperature of 75 degrees C. for 15 hours to provide a solution which, after the distillation of some naphtha and some styrene was clear. The clear material could be spread as a film which air-dried quite rapidly.

EXAMPLE XIV

In this example, copolymers were prepared in which mixtures of styrene and vinyl ether were employed as a monomer system for interpolymerization with substantially neutral esters of itaconic or maleic acid. By use of the combination of monomers, it was possible to obtain interpolymers of high chemical resistance and good flexibility. A number of interpolymers which contained from 50 to 75% by weight upon the basis of total reactants of combined monomer were so prepared and the monomer systems comprised from 10 to 40 percent by weight, based upon the total monomer, of vinyl ethyl ether and/or vinyl butyl ether. When the combined monomer constituted 60 to 70 percent of the resin solids and the vinyl butyl ether constituted about 25 to 30 percent of the charge of styrene and vinyl ether a fast-drying, lacquer-like material of good flexibility resulted. The chemical resistance of the films was good. The preparation of a good product comprising styrene and vinyl ethers as a monomer system is typified by the following procedure:

The base resin was an essentially neutral ester of soya oil, pentaerythritol and itaconic acid containing itaconic acid in such ratio as to esterify 33 molar percent of the hydroxyls of the system and which had a solids content of 90.5% and a viscosity of D. To 15 grams of this resin was added 25 grams of styrene and 5 grams of vinyl butyl ether. 50 grams of xylene were employed as a solvent and 0.25 gram of cumene hydroperoxide was added in increments as a catalyst. The mixture was refluxed for 5 hours to provide a clear product which when spread as a film and dried was clear and flexible.

EXAMPLE XV

According to this example, a base resin was employed comprising as starting components linseed oil, pentaerythritol and maleic anhydride and in which 33 molar percent of the available hydroxyls were neutralized with maleic anhydride. This product had a viscosity of N and a solids content of 98.5%. A 30 gram portion of this base resin was mixed with 50 grams of styrene, 20 grams of vinyl butyl ether, 1 gram of acrylic acid and 2 grams of cumene hydroperoxide, 100 grams of xylene being employed as a solvent. The mixture was refluxed for 5 hours. The product when dried provided a clear, fast-drying film.

In this example all or a part of the styrene may be replaced by a stoichiometrically equivalent amount of acrylonitrile to provide interpolymers of the essentially neutral ester, acrylonitrile, and a vinyl ether with or without added styrene. Acrylonitrile may thus replace 5 to 95 percent by weight of the styrene. The interpolymers of the ester, the styrene, the acrylonitrile and the vinylic ether form milky suspensions in aliphatic hydrocarbons. Such suspensions when spread as films and dried form a clear continuous layer of good properties.

EXAMPLE XVI

In this example, alpha methyl styrene was employed in combination with styrene as a monomer system which when interpolymerized with a neutral ester as herein disclosed gave products of high naphtha tolerance. Products were thus prepared embodying a copolymer containing 45 to 50% by weight based upon solids content of combined monomer. The monomer mixture comprised 25 to 30 percent of alpha methyl styrene, the rest being styrene. Resins prepared by interpolymerizing such mixtures were highly naphtha tolerant, it being found, for example, that 5 parts by weight of resin solids were compatible with as much as 50 parts by weight of an aliphatic naphtha of high boiling point. In conducting the interpolymerization reaction, the temperature may be that of refluxing of the solvent. A temperature in the range of about 150 to 200° C. is satisfactory. At the higher temperature it may be desirable to conduct the reaction in a pressure apparatus in order to prevent the loss of solvent or other volatile materials in the reaction system.

An interpolymer product comprising about 45% of mixed styrene and alpha methyl styrene and 55% (by weight) of maleic acid-oil ester has been found to have good hardness and flexibility. The drying speed is also very good. The latter will depend to some extent upon the oil employed. Products containing linseed oil as the oil of the base resin dry quite rapidly. On the other hand, soya oil in the base resin has been found to provide products of superior flexibility and color. Pentaerythritol is very satisfactory as the added polyol.

A suitable charge for preparation of interpolymers comprising mixtures of styrene and alpha-methyl styrene as the monomer components may include 100 grams of a substantially neutral linseed oil-pentaerythritol-maleic anhydride ester in which 33 molar percent of the hydroxyls are neutralized by the maleic component. This ester is mixed with 75 grams of styrene and 25 grams of alpha-methyl styrene, the solvent being 50 grams of aliphatic naphtha of a boiling range of 100 to 165° C. A suitable catalyst of reaction comprises 8 grams of cumene hydroperoxide.

A convenient procedure for effecting the interpolymerization comprises refluxing the foregoing mixture for 4 hours at a temperature of about 150° C. Subsequently, the product is heated to 200° C. for purposes of removing the solvent. Final traces of solvent may be removed by blowing the interpolymer product with inert gas such as carbon dioxide, nitrogen or flue gases from the burning of butane in air. The final product may be thinned in a solvent such as an aliphatic naphtha to provide a coating composition which can be spread as a film and dried to a hard, adherent state.

Acrylic acid may be included as a component of the interpolymerizable mixture of base resin, styrene and alpha methyl styrene. An appropriate proportion of such modifier would be approximately 1 to 2%, based upon the interpolymerizable mixture. A suitable reaction temperature for the interpolymerization is 175° C.

Soya-bean oil may be substituted for linseed oil in the preparation of the neutral ester component of the foregoing interpolymer. When such substitution is made, the reaction conveniently is carried to a temperature of 225° C.

If the reaction is to be conducted under reflux condenser it is desirable that the solvent employed be of a boiling point approximating the foregoing temperature ranges. If pressure apparatus is available, lower boiling solvents are permissible.

In this example, alpha-methyl styrene may be replaced in part or in full with a diene hydrocarbon such as dicyclopentadiene or alpha-ethyl styrene to provide products which are also of high naphtha tolerance.

EXAMPLE XVII

Another class of products having exceptional resistance to marring and an extremely fast rate of drying is obtained by interpolymerization of styrene and acrylonitrile with a neutral ester of a drying oil of the glyceride type, a polyol and maleic or itaconic acid. In an example, the ester component comprises a linseed oil, pentaerythritol, maleic anhydride material in which 33 percent of the hydroxyls were neutralized with maleic anhydride. The ester was of a viscosity of R plus. 20 grams of this resin, 5 grams of acrylonitrile and 25 grams of styrene were dissolved in 50 grams of xylene and were catalyzed with 0.5 gram of cumene hydroperoxide. The mixture was refluxed for 5 hours. The product formed films which dried rapidly to a clear, flexible, mar-resistant state.

EXAMPLE XVIII

In this example, a linseed oil-pentaerythritol-maleic anhydride ester similar to the one described in Example XVII was employed. This resin in a proportion of 50 grams was mixed with 37.5 grams of styrene and 12.5 grams of acrylonitrile in 100 grams of aliphatic naphtha having a boiling range of 100 to 165° C. Cumene hydroperoxide in an amount of 1 gram was employed product was milky, but when spread as film and dried, provided a clear, hard, mar-resistant surface.

EXAMPLE XIX

It has also been found that a certain amount of alpha-methyl styrene may be incorporated into the copolymerizable mixtures of Example XVII to provide products of improved gloss. This procedure is illustrated as follows:

Admix a linseed oil-pentaerythritol-maleic acid ester such as described in Example XVII and in a proportion of 20 grams with 10 grams of styrene, 10 grams of alpha-methyl styrene and 10 grams of acrylonitrile with 1 gram of cumene hydroperoxide as a catalyst and 50 grams of xylene as a solvent. Reflux the mixture for 5 hours. The resultant cloudy, viscous solution when spread and dried provides a film which is clear and flexible.

EXAMPLE XX

Products having high outdoor durability, high resistance to crazing, good color, high heat stability, and which have very rapid rates of drying may be prepared by the interpolymerization of the substantially neutral esters hereinbefore described with methyl methacrylate as a monomer. To prepare such product 520 grams of a base resin which was a substantially neutral ester of linseed oil pentaerythritol and itaconic acid, in which 40 molar percent of the available hydroxyls of the polyol components was neutralized with the itaconic acid component and 480 grams of methyl methacrylate were dissolved in xylene in a proportion of 1000 grams and were catalyzed with 5 grams of benzoyl peroxide. The mixture was heated for 16 hours at 100° C. The resultant interpolymer, when spread as film and dried, provided a clear, hard, flexible surface coating.

EXAMPLE XXI

In this example vinyl toluene which is a mixture of paramethyl styrene and ortho-methyl styrene has been employed as a monomer component. The base resin was a substantially neutral soya oil-pentaerythritol-itaconic acid ester in which 33 molar percent of the hydroxyls were esterified by the itaconic acid; 25 grams of this base resin and 25 grams of vinyl toluene were dissolved in xylene and the mixture, catalyzed with cumene hydroperoxide in a proportion of 0.5 gram was refluxed for 5 hours. Some solvent and vinyl toluene were evaporated to provide a product of a viscosity of G plus. The product when spread, dried to hard, clear films.

EXAMPLE XXII

In this example, ethyl methacrylate was employed as a monomer. The base resin was a linseed oil pentaerythritolitaconate in which 40% of the hydroxyls were esterified with the itaconic acid; 60 grams of the base resin, 140 grams of the ethyl methacrylate and 1 gram of benzoyl peroxide in 200 grams of aliphatic naphtha were heated for 16 hours at 160° C. The product when spread as a film and dried was clear and of good alkali resistance.

EXAMPLE XXIII

A mixture of styrene and vinyl cyclohexene constitutes a good monomer system. In an example the base resin was a linseed oil-pentaerythritol-maleic anhydride ester in which 33 molar percent of the hydroxyls were neutralized by the maleic anhydride. The base resin in an amount of 60 grams was mixed with 98 grams of styrene, 42 grams of cyclohexane and 8 grams of cumene hydroperoxide, 200 grams of high boiling naphtha being employed as a solvent. The mixture was refluxed for 5 hours to provide a product which when spread as a film and dried provided a clear coating.

EXAMPLE XXIV

In this example, a mixture of styrene and methyl methacrylate was employed as a monomer system. The polyester was of linseed oil pentaerythritol, and maleic anhydride, 33 molar percent of the total hydroxyls being esterified by the maleic acid. The interpolymerizable mixture comprises 12.5 grams of styrene, 12.5 grams of methyl methacrylate, 25 grams of the ester and 1 gram of cumene hydroperoxide dissolved in 50 grams of xylene. The mixture was refluxed for 21 hours to form a turbid solution. The product when spread formed clear, flexible films.

Although specific examples of the invention have been set forth above, it is not intended to limit the invention solely thereto, but to include all of the variations and modifications falling within the scope of the appended claims.

I claim:

1. The method of preparing a soluble, ungelled interpolymer, which comprises dissolving in a solvent thereof (A) a diester which is of an acid value below about 15 and which is the esterification product of (1) about 1 mole of dicarboxylic acid at least 80 percent by weight of which is alpha-beta ethylenic and any residue of which is saturated and (2) about 2 moles of a mono-hydric ester of a polyhydric alcohol and a drying glyceride oil fatty acid and (B) a liquid polymerizable monomer containing a single $>C=CH_2$ group and heating the mixture to the reflux temperature of the solvent.

2. The method of preparing a soluble, ungelled interpolymer characterized by its ability to dry to a hard, clear film, which comprises the steps of dissolving in xylene (A) a diester which is of an acid value below about 15 and which is the esterification product of essentially (1) a monohydric ester of an alcohol containing from 2 to 6 hydroxyl groups and the acids of a glyceride drying oil and (2) an alpha, beta ethylenically unsaturated dicarboxylic acid and (B) a monolefinic monomer containing a single $>C=CH_2$ group, and heating the mixture to reflux temperature of the xylene.

3. The method of preparing a soluble, ungelled interpolymer characterized by its ability to dry to a hard, clear film, which comprises the steps of dissolving in xylene (A) a diester which is of an acid value below about 15 and which is the esterification product of a mixture consisting essentially of (1) about 2 moles of a monohydric ester of a polyhydric alcohol and a glyceride drying oil acid and (2) 1 mole of an alpha-beta ethylenically unsaturated dicarboxylic acid and (B) a liquid polymerizable monomer comprising a single $>C=CH_2$ group, and heating the mixture to reflux temperature of the xylene.

4. The method of preparing a soluble, ungelled interpolymer, which comprises forming a mixture consisting essentially of interpolymer, which comprises forming a mixture consisting essentially of xylene constituting a solvent of the reaction mixture and as reactants, (A) a diester which is of an acid value below about 15 being formed by esterification reaction of a mixture consisting essentially of (1) about 1 mole of an alpha-beta ethylenic, dicarboxylic acid and (2) about 2 moles of a monohydric ester of a polyhydric alcohol and a drying glyceride oil acid, about 25 to 50 percent of the hydroxyls of the polyhydric alcohol in the diester being esterified by the carboxyls of the dicarboxylic acid and (B) a liquid polymerizable monolefinic monomer containing a single $>C=CH_2$ group and heating the mixture to the reflux temperature of the xylene.

5. The method of preparing a soluble, ungelled interpolymer characterized by an ability, when spread as a film, to dry to a hard clear state, which comprises the steps of forming a mixture of xylene reactants, (A) a diester which is of an acid value below about 15 which is the esterification product of about 1 mole of an acid of a class consisting of itaconic acid, maleic acid and fumaric acid and (2) about 2 moles of a monohydric ester of an alcohol selected from the class consisting of glycerol, pentaerythritol, and ethylene glycol, and a drying oil acid of a class consisting of linseed oil acid, soya acid, dehydrated castor oil acid, safflower oil acid, and (B) 5 to 80 percent, based upon the ester of the dicarboxylic acid and the monohydric ester of a polyhydric alcohol and the drying oil acid, of a monomer containing a $>C=CH_2$ group and heating the mixture to reflux temperature of the xylene.

6. The method of claim 2 wherein the unsaturated dicarboxylic acid is employed in such an amount that 25 to 50 molar percent of the available hydroxyls are neutralized by said polycarboxylic acid.

7. The method of claim 2 wherein the unsaturated dicarboxylic acid is employed in such an amount that 33 to 45 molar percent of the available hydroxyls are neutralized by said carboxylic acid.

8. The method of claim 3 wherein the ethylenically unsaturated polycarboxylic acid is employed in such an amount that 25 to 50 molar percent of the available hydroxyls in said hydroxyl ester are neutralized by said polycarboxylic acid.

9. The method of claim 3 wherein the ethylenically unsaturated polycarboxylic acid is employed in such an amount that 33 to 45 molar percent of the available hydroxyls in said hydroxyl ester are neutralized by said polycarboxylic acid.

10. The method of claim 5 wherein the alpha-beta unsaturated dicarboxylic acid utilized is maleic acid.

11. The method of claim 5 wherein the alpha-beta unsaturated dicarboxylic acid utilized is itaconic acid.

12. The method of claim 5 wherein the compound containing a $CH_2=C<$ group is styrene.

13. The method of claim 5 wherein the $CH_2=C$ groups are provided by a mixture of styrene and alpha-methyl styrene.

14. The method of claim 5 wherein the compound containing a $CH_2=C<$ group is methyl methacrylate.

15. The method of claim 5 wherein the $CH_2=C<$ groups are provided by a mixture of styrene and acrylonitrile.

16. The method of claim 5 wherein the $CH_2=C<$ groups are provided by a mixture of styrene and a diene hydrocarbon.

17. A soluble, ungelled interpolymer prepared according to the method of claim 5.

References Cited in the file of this patent

UNITED STATES PATENTS

| | | |
|---|---|---|
| 2,255,313 | Ellis | Sept. 9, 1941 |
| 2,404,836 | Gerhart et al. | July 30, 1946 |
| 2,559,465 | Root | July 3, 1951 |
| 2,559,466 | Root | July 3, 1951 |
| 2,598,645 | Marling | May 27, 1952 |
| 2,600,457 | Wynstra | June 17, 1952 |
| 2,647,092 | Meeske et al. | July 28, 1953 |

FOREIGN PATENTS

| | | |
|---|---|---|
| 670,119 | Great Britain | Apr. 16, 1952 |

UNITED STATES PATENT OFFICE
Certificate of Correction

September 2, 1958

Patent No. 2,850,469

Roger M. Christenson

It is hereby certified that error appears in the printed specification of the above numbered patent requiring correction and that the said Letters Patent should read as corrected below.

Column 1, lines 44 and 45, for "component" read —components—; column 2, line 7, for "grups" read —groups—; column 8, line 3, for "dicyclopentadjene" read —dicyclopentadiene—; line 13, for "glycols" read —glycol—; line 19, for "now" read —not—; line 26, for "ethyleneic" read —ethylenic—; column 17, line 71, for "alpha, beta" read —alpha-beta—; column 18, line 70, for the formula "$CH_2=C$" read $CH_2=C<$—.

Signed and sealed this 19th day of May 1959.

[SEAL]

Attest:
KARL H. AXLINE,
*Attesting Officer.*

ROBERT C. WATSON,
*Commissioner of Patents.*